(12) United States Patent
Legranger et al.

(10) Patent No.: US 9,716,410 B2
(45) Date of Patent: Jul. 25, 2017

(54) ROTOR FOR A ROTATING ELECTRIC MACHINE AND ROTATING ELECTRICAL MACHINE COMPRISING SUCH A ROTOR

(71) Applicant: VALEO EQUIPEMENTS ELECTRIQUES MOTEUR, Creteil (FR)

(72) Inventors: Jerome Legranger, Creteil (FR); Jean-Claude Matt, Dijon (FR); Lilya Bouarroudj, Charenton le Pont (FR); Frederic Palleschi, Thiais (FR)

(73) Assignee: Valeo Equipements Electriques Moteur (FR)

( * ) Notice: Subject to any disclaimer, the term of this patent is extended or adjusted under 35 U.S.C. 154(b) by 382 days.

(21) Appl. No.: 14/354,732

(22) PCT Filed: Oct. 8, 2012

(86) PCT No.: PCT/FR2012/052273
§ 371 (c)(1),
(2) Date: Apr. 28, 2014

(87) PCT Pub. No.: WO2013/060960
PCT Pub. Date: May 2, 2013

(65) Prior Publication Data
US 2014/0361656 A1 Dec. 11, 2014

(30) Foreign Application Priority Data

Oct. 27, 2011 (FR) ...................... 11 59760

(51) Int. Cl.
*H02K 1/27* (2006.01)
(52) U.S. Cl.
CPC ............. *H02K 1/2773* (2013.01); *H02K 1/27* (2013.01); *H02K 1/276* (2013.01); *H02K 2213/03* (2013.01)

(58) Field of Classification Search
CPC .... H02K 1/27; H02K 1/2773; H02K 2213/03; H02K 1/2753; H02K 1/276
(Continued)

(56) References Cited

U.S. PATENT DOCUMENTS

| 6,239,525 B1 * | 5/2001 | Matsunobu | ............ H02K 1/278 310/156.38 |
| 2003/0025414 A1 * | 2/2003 | Kaneko | ................ H02K 1/2786 310/156.38 |

(Continued)

FOREIGN PATENT DOCUMENTS

| DE | 102009026524 | 12/2010 |
| FR | 2084279 | 12/1971 |

(Continued)

OTHER PUBLICATIONS

Watanabe et al, JP 5240593 English abstracts, Jul. 2013.*

*Primary Examiner* — John K Kim
(74) *Attorney, Agent, or Firm* — Berenato & White, LLC

(57) ABSTRACT

The rotor comprises of a plurality of alternating north poles (N) and south poles (S) formed from a plurality of permanent magnets (3) having a radial polygonal section and arranged in first recesses (4). These first recesses extend axially and are distributed regularly between a circumferential portion (5) and a central portion (6) of the magnetic mass (2) of the rotor in such a way as to define a plurality of circumferential polar sections (10). The radial section comprises a substantially rectangular portion (8) next to the circumferential portion adjacent to a substantially trapezoidal portion (7) next to the central portion. The rotor has a ratio (R) between a first height (h) of the trapezoidal portion and a second height (H) of the rectangular portion, in a radial direction, is predetermined in such a way as to maximize the efficiency of the electric machine.

13 Claims, 2 Drawing Sheets

(58) Field of Classification Search
USPC ............. 310/156.38, 156.53, 156.56, 156.57
IPC ........................................................ H02K 1/27
See application file for complete search history.

(56) References Cited

U.S. PATENT DOCUMENTS

| 2009/0184597 | A1* | 7/2009 | Lee ........................ | H02K 1/276 |
| | | | | 310/156.56 |
| 2010/0277028 | A1* | 11/2010 | Alexander ........... | H02K 1/2773 |
| | | | | 310/156.51 |
| 2010/0289386 | A1* | 11/2010 | Gerstler ............... | H02K 1/2773 |
| | | | | 310/60 A |
| 2013/0009505 | A1* | 1/2013 | Watanabe ............ | H02K 1/2766 |
| | | | | 310/156.08 |
| 2014/0361656 | A1* | 12/2014 | Legranger ............ | H02K 1/2773 |
| | | | | 310/156.38 |

FOREIGN PATENT DOCUMENTS

| JP | 2000156946 A | 6/2000 | | |
| JP | 2010213457 A | 9/2010 | | |
| JP | 5240593 B2 * | 7/2013 | ........... | H02K 1/2766 |

\* cited by examiner

ROTOR FOR A ROTATING ELECTRIC MACHINE AND ROTATING ELECTRICAL MACHINE COMPRISING SUCH A ROTOR

CROSS-REFERENCE TO RELATED APPLICATIONS AND CLAIM TO PRIORITY

This application is a national stage application of International Application No. PCT/FR2012/052273 filed Oct. 8, 2012, which claims priority to French Patent Application No. 1159760 filed Oct. 27, 2011, of which the disclosures are incorporated herein by reference and to which priority is claimed.

TECHNICAL FIELD OF THE INVENTION

The present invention relates to a rotor with permanent magnets which is designed for a rotary electrical machine.

The invention also relates to a rotary electrical machine comprising a rotor of this type, in particular for applications such as an electric traction motor or accessory motor in electric and hybrid motor vehicles.

TECHNOLOGICAL BACKGROUND OF THE INVENTION

As a result of their increased performance in terms of specific power and power density, nowadays synchronous machines with permanent magnets have extensive application in the field of motor vehicles.

These electrical machines can be produced in an extensive range of powers and speeds, and have applications both in vehicles of the "all electric" type and in vehicles with low $CO_2$ emissions of the so-called "mild-hybrid" and "full-hybrid" types.

"Mild-hybrid" applications generally concern electrical machines of approximately 8 to 20 kW, for example an electric motor which is fitted on the front surface of a thermal engine, and is coupled to the latter by a drive belt. With an electric motor of this type it is possible to reduce the capacity of the thermal engine ("engine downsizing") by providing electric torque assistance which supplies supplementary power, in particular when revving up. In addition, traction at low speed, for example in an urban environment, can also be ensured by this same electric motor.

Applications of the "full-hybrid" type generally concern 30 to 50 kW motors for architectures of the series and/or parallel type, with a level of integration which is more accomplished that the electric motor(s) in the traction chain of the vehicle.

The remarkable performance levels of the present machines with permanent magnets are to a large extent due to the development of rare-earth magnets of the neodymium—iron—boron (NeFeB), samarium—iron (SmFe), or samarium—cobalt (SmCo) type, which can have residual magnetism in excess of Tesla level.

However, machines with permanent magnets comprising a rotor with a so-called "flow concentration" structure had long since made it possible to obtain substantial magnetic flows using magnets with lower residual magnetism, for example magnets obtained from sintered or bonded ferrites.

Also long since, the dimensional and magnetic characteristics of this type of structure have been optimised, either by carrying out many tests, or, more recently, by carrying out computer simulations, such as to improve the electrical performance of the machines.

An example of dimensional optimisation of the magnets and magnetic poles of a rotor with permanent magnets was disclosed in 1971 in the patent of invention FR 2.084.279.

The dimensional optimisation of the magnets has recently become the subject of attention once more as the result of an increase in the price of rare earth magnets, associated with an unfavourable geo-political situation.

Since the implementation of rare earth magnets in a rotor of an electrical machine designed for motor vehicle applications is no longer economically viable, and probably not sustainable, the other alternative consists of magnets based on ferrites.

However, since the residual magnetism or induction of a ferrite is lower than in the case of a rare earth magnet, it is necessary to increase the volume of ferrite of the magnet in order to obtain an equivalent magnetic flow.

With this magnetic constraint being imposed, it will be appreciated that the volume of the ferrite magnets cannot be increased indefinitely in a rotor with a given size.

GENERAL DESCRIPTION OF THE INVENTION

The object of the present invention is thus to optimise the volume of the magnets of a rotor, in order to maximise the performance of the machine, whilst complying with the dimensional and mechanical constraints specified.

Specifically, its subject is a rotor of a rotary electrical machine comprising a plurality of alternating North poles and South poles, formed from a plurality of permanent magnets arranged in first recesses.

These first recesses extend axially, and are distributed regularly between a circumferential part and a central part of the magnetic mass of the rotor, such as to define a plurality of circumferential polar sections.

The permanent magnets of the rotor type in question have a polygonal radial section.

According to the invention, the radial section of the permanent magnets comprises a substantially rectangular part close to the circumferential part, adjacent to a substantially trapezoidal part close to the central part, with a ratio R of a first height h of the trapezoidal part, to a second height H of the rectangular part, in a radial direction, which is between 0.25 and 0.70, and is predetermined such as to maximise the performance of the said electrical machine.

Each of the polar sections of the rotor according to the invention is preferably retained radially by a central tongue which extends axially, and forms a partition between two of the first consecutive recesses.

In this case, a width L of the rectangular part, in a circumferential direction, is predetermined such as to maximise the volume of each of the permanent magnets, within a limit $\sigma_0$ of the mechanical stresses $\sigma$ withstood by this tongue during functioning of the machine.

More particularly, the ratio of the heights h/H which characterises the section of the magnets has an upper limit according to a predetermined minimum thickness E of the tongue within this same limit $\sigma_0$ of the mechanical stresses $\sigma$ withstood by the latter.

Benefit will be derived from the fact that the permanent magnets of the rotor of the rotary electrical machine according to the invention consist of ferrite.

According to a particular embodiment, the rotor according to the invention additionally comprises a plurality of second recesses which extend axially, and are arranged between the permanent magnets, in an intermediate part of the rotor, between the central part and the circumferential part.

According to another particular embodiment, the circumferential part of this rotor is open radially, at least partially, opposite the permanent magnets.

The invention also relates to a rotary electrical machine which comprises a rotor with the above characteristics.

These few essential specifications will have made apparent to persons skilled in the art the advantages provided by the rotor of the rotary electrical machine according to the invention, as well as by the corresponding electrical machine, in comparison with the prior art.

The detailed specifications of the invention are provided in the following description in association with the appended drawings. It should be noted that these drawings simply serve the purpose of illustrating the text of the description, and do not constitute in any way a limitation of the scope of the invention.

DESCRIPTION OF THE PREFERRED EMBODIMENTS OF THE INVENTION

Figure 1:
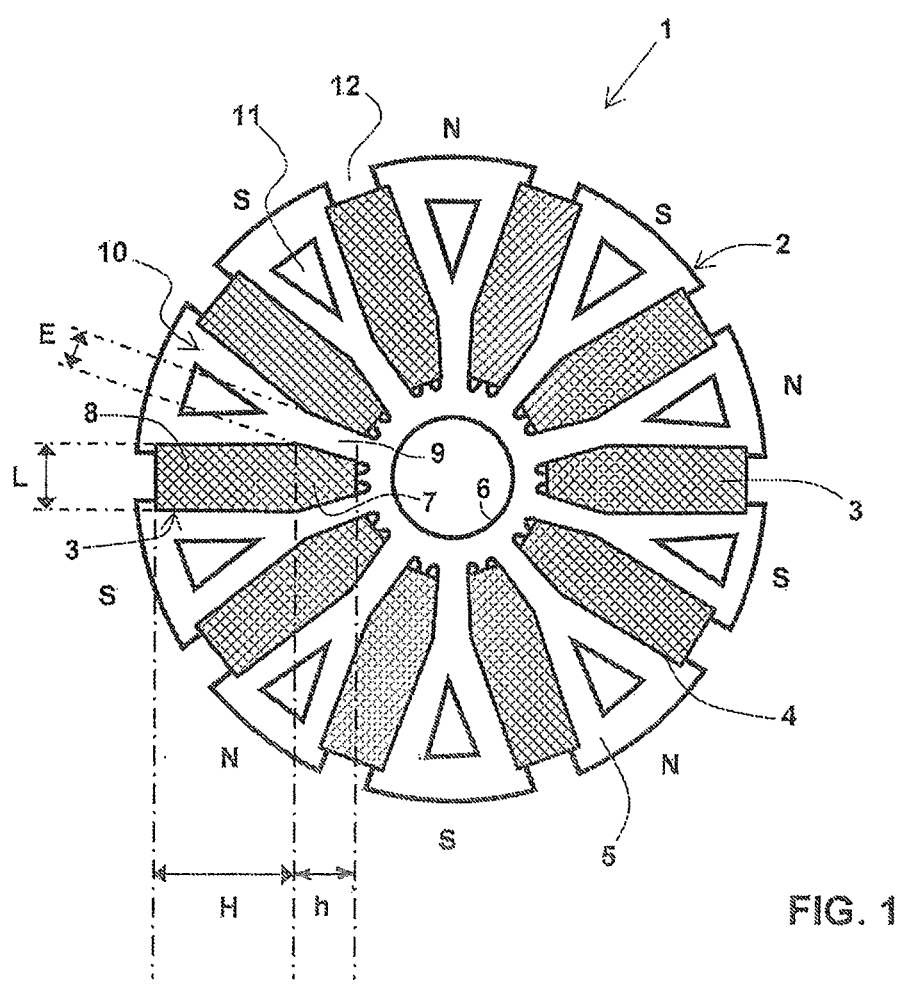
FIG. 1 shows a simplified view in radial cross-section of a rotor with permanent magnets according to the invention.

The simplified radial cross-section of a rotor 1 with permanent magnets 3 in the preferred embodiments of the invention, represented in FIG. 1, shows clearly the arrangement in a magnetic mass 2 of the permanent magnets 3 in first recesses 4 which are distributed regularly between a radially outer circumferential part 5 and a central part 6, such as to form a plurality of alternating north poles N and south poles S.

A specific embodiment of a machine comprising a rotor of this type is for example an 8 to 20 KW motor/generator for applications in motor vehicles of the so-called "mild-hybrid" type.

In its mode in which it is functioning as a motor, this machine can be designed for starting of the thermal engine, torque assistance for the thermal engine, as well as for electric traction of the vehicle at low speed.

According to a particular embodiment of this machine, a rotor 1 comprising ten permanent magnets 3 rotates inside a stator (not represented) with a plurality of notches.

The stator and the rotor 1 are produced in a conventional manner with sets of metal plates which form the magnetic mass 2.

The notches in the stator are designed to receive stator windings (not represented), and form between one another a plurality of stator teeth. Depending on the embodiments, the notches will be designed to accommodate concentrated windings, wound onto large teeth, or distributed windings.

A stator current passes through the stator windings, thus creating a rotary magnetic field which drives the rotor 1. The engine torque supplied depends in particular on the intensity of the stator current Is and the magnetic flow in the rotor 1.

As explained in the preamble, the replacement of the rare earth magnets by ferrite magnets requires more voluminous magnets in order to obtain a similar magnetic flow in the rotor 1.

For the purpose of maintaining the same engine torque for the same stator intensity Is, the volume of the ferrite magnets must therefore be optimised.

The rotors with a concentration of flow known according to the prior art generally comprise magnetic bars with a rectangular straight section arranged on equi-angular axial planes.

Consequently, a width of a bar according to a circumferential direction is limited by a length of the span of a circular section of a central part of the rotor, whereas the bar occupies only a small part of the magnetic mass in the circumferential part.

For the purpose of maximising the volume of the magnets 3, the invention thus proposes providing part of the magnet 3 close to the central part 6 of the rotor 1 with a form in the shape of a wedge.

Thus, a radial section of a magnet 3 in the rotor 1 has a substantially trapezoidal part 7 close to the central part of the rotor 1, and a substantially rectangular part 8 close to the circumferential part 5.

Tests with electrical machines comprising a rotor 1 with magnets 3 in the form of a wedge, and computer simulations, led the inventive body to consider that a ratio R of a first height h of the trapezoidal part 7 to a second height H of the rectangular part 8, in a radial direction, was a parameter which affected the electrical performance of a machine.

Figure 2:
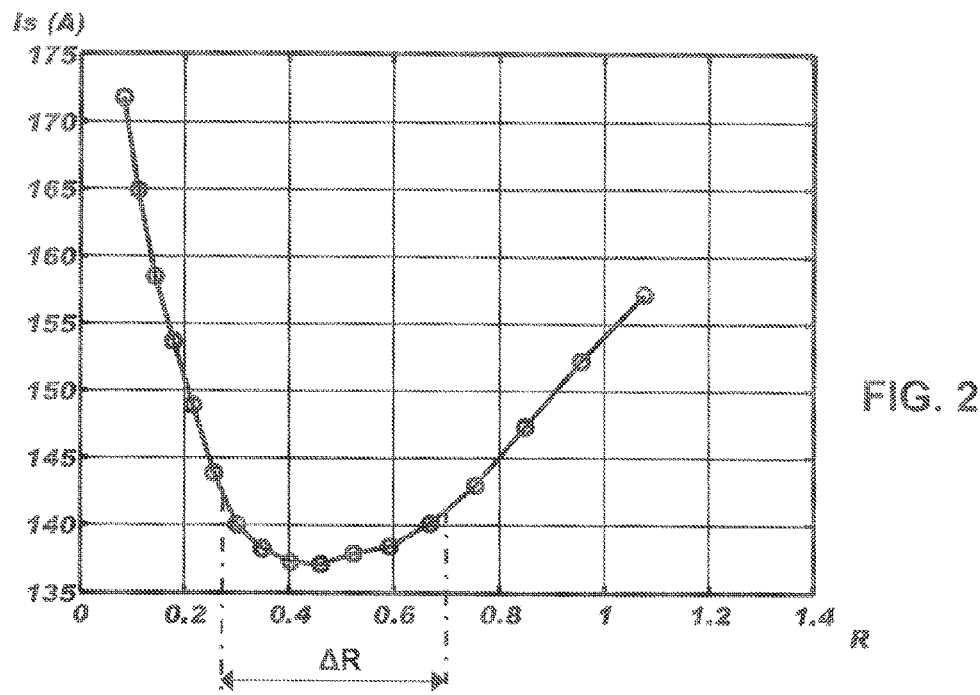
FIG. 2 shows the variation of the stator current of an electrical machine comprising a rotor with permanent magnets of the type according to the invention, according to the ratio of heights which characterises a radial section of these permanent magnets, for a constant engine torque.

FIG. 2 shows the stator current Is necessary in order to obtain the same engine torque according to this ratio R of the heights h/H for a test machine.

It is found that there is a range of a value ΔR of the ratio of the heights h/H where the stator intensity is minimal: in fact, in this example, between 0.25 and 0.7 this intensity Is is approximately 140 A, whereas it tends rapidly towards intensities which exceed 175 A when the section of the magnet 3 tends towards a rectangular section (R=0). Particularly, the values ΔR of the ratio of the heights h/H is between 0.4 and 0.6. The mechanical stresses sustained by the rotor 1 during functioning have also been taken into account by the inventive body, in order to optimize the volume of the magnets 3.

In the particular embodiment of the rotor 1 shown in FIG. 1, the sides of the substantially trapezoidal part 7 of the section of the magnets 3 are situated on planes parallel to axial planes of the rotor 1 (the large base and the small base being situated substantially on planes parallel to a plane tangential to the rotor 1).

The first recesses 4 containing the magnets 3 are therefore separated by central tongues 9 forming partitions with a thickness E, which is selected as a low value in order to minimise the leakages of flow via the central part 6 of the rotor. As illustrated in FIG. 1, the central tongues (9) are circumferentially spaced from each other by the trapezoidal parts (7) of the permanent magnets (3). In this particular embodiment, the thickness E is constant, but it will be noted that it can be variable in certain embodiments.

These tongues 9 retain radially the circumferential polar sections 10 defined in the magnetic mass 2 by the first recesses 4.

The polar sections 10 themselves retain the magnets 3 radially, and the tongues 9 must have the minimal mechanical strength required in order to withstand the centripetal forces derived from the effect of the rotation of the rotor 1 on the magnets 3 and the polar sections 10.

A width L of the magnets 3 and the thickness E of the tongues 9 in a circumferential direction are two parameters which vary inversely for geometric reasons. The width L is therefore increased such as to maximize the volume of the magnets 3, provided that the thickness E of the tongues is sufficient to allow them to withstand the mechanical stresses σ. As illustrated in FIG. 1, the width L of the magnets 3 in a circumferential direction is less than a sum of the first height h of the trapezoidal part (7) and the second height H of the rectangular part (8) of the magnets 3 in a radial direction.

Figure 3:
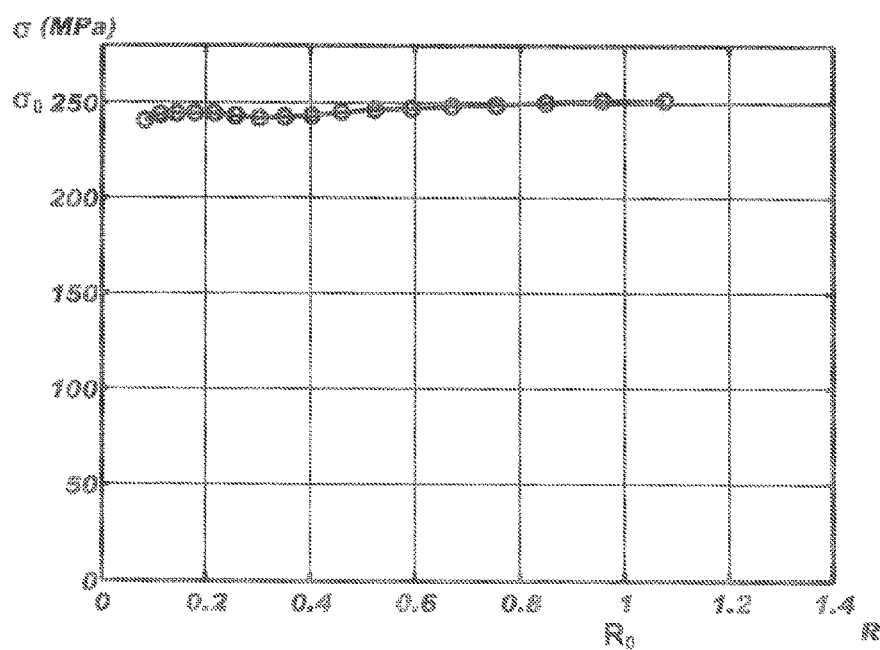
FIG. 3 shows the variation of the mechanical stresses withstood during functioning by a tongue which maintains radially a polar section of the rotor with permanent magnets of the type according to the invention, according to the ratio of heights which characterises a radial section of these permanent magnets, for a constant engine torque.

For the same geometric reasons, the ratio R of the heights h/H affects the level of the mechanical stresses σ withstood by a tongue 9, as shown in FIG. 3.

In this example, it is considered that the limit $\sigma_0$ not to be exceeded is approximately 250 MPa. The ratio R of the heights h/H therefore may not exceed a value $R_0$ of approximately 1.

The rotor 1 according to the invention highly advantageously comprises a plurality of second recesses 11, which are arranged in the polar sections 10, as shown clearly in FIG. 1.

In addition to their function of contributing towards the control of the magnetic field in the rotor 1, these second recesses 11 decrease the mass of the polar sections 10, and consequently decrease the mechanical stresses σ withstood by the tongues 9 due to these polar sections 10, thus making it possible to increase the mass of the magnets 3 concurrently.

Each of the first recesses 4 of the rotor 1 according to the invention preferably comprises an opening 12 towards a radially outer periphery of the magnetic mass 2.

These openings have the effect of increasing the reluctance of these parts of the magnetic circuit, and therefore of limiting the leakage flow of the magnets 3, whilst also contributing towards the decrease in the mass of the circumferential part 5 of the rotor 1, thus making it possible to increase the mass of the magnets 3, whilst remaining within the same limit $\sigma_0$ of the mechanical stresses withstood by the tongues 9.

It will be appreciated that the invention is not limited simply to the above-described preferred embodiments.

In particular, magnets 3 with a radial section comprising a rectangular part 8 and a trapezoidal part 7 advantageously consist of two juxtaposed bars, one having a rectangular straight section and the second having a trapezoidal straight section.

Other embodiments based on numerical values different from those specified above, and corresponding to other tests or simulations of rotary electrical machines comprising a rotor of the type described, would not be beyond the scope of the present invention, provided that they are derived from the following claims.

The invention claimed is:

1. A rotor (1) of a rotary electrical machine, comprising:
a magnetic mass (2);
a plurality of alternating North (N) poles and South poles (S) are formed by a plurality of permanent magnets (3) arranged in first recesses (4) extending axially in said magnetic mass (2), said permanent magnets (3) are distributed regularly between a radially outer circumferential part (5) and a central part (6) of said magnetic mass (2) of the rotor (1), such as to define a plurality of circumferential polar sections (10), each of said permanent magnets (3) having a polygonal radial section; and a plurality of second recesses (11) extending axially, and arranged between said permanent magnets (3), in an intermediate part of the rotor, and radially between said central part (6) and said radially outer circumferential part (5),
wherein said polygonal radial section comprises a trapezoidal part (7) close to said central part (6) and a rectangular part (8) close to said radially outer circumferential part (5), said rectangular part (8) is adjacent to said trapezoidal part (7),
wherein a ratio R of a first height h of said trapezoidal part (7) to a second height H of said rectangular part (8) in a radial direction is between 0.25 and 0.70, and is predetermined such as to maximize the performance of said electrical machine, and
wherein each of the first recesses (4) comprises an opening (12) towards a radially outer periphery of said magnetic mass (2).

2. The rotor (1) according to claim 1, wherein each of said polar sections (10) is retained radially by a central tongue (9) which extends axially, and forms a partition between consecutive two of said first recesses (4), wherein each of said central tongues (9) extends radially outwardly between said central part (6) and one of said circumferential polar sections (10), and wherein said central tongues (9) are circumferentially spaced from each other by said trapezoidal parts (7) of said permanent magnets (3).

3. The rotor (1) according to the preceding claim 2, wherein a width L of said rectangular part (8), in a circumferential direction, is predetermined such as to maximise the volume of each of said permanent magnets (3), within a limit σ of the mechanical stresses σ withstood by said tongue (9).

4. The rotor (1) according to claim 1, wherein said permanent magnets (3) comprise ferrite.

5. The rotor (1) according to claim 1, wherein each of said openings (12) is disposed so that said circumferential part (5) is open radially, at least partially, opposite said permanent magnets (3).

6. The rotor (1) according to claim 2, wherein said permanent magnets (3) consist of ferrite.

7. The rotor (1) according to claim 3, wherein said permanent magnets (3) consist of ferrite.

8. A rotary electrical machine, comprising a rotor (1) according to claim 2.

9. A rotary electrical machine, comprising a rotor (1) according to claim 3.

10. A rotary electrical machine, comprising a rotor (1) according to claim 4.

11. The rotor (1) according to claim 3, wherein the width L of said rectangular part (8) of each of said permanent magnets (3) is less than a sum of said first height h of said trapezoidal part (7) and said second height H of said rectangular part (8) of each of said permanent magnets (3).

12. The rotor (1) according to claim 1, wherein said ratio R of said first height h of said trapezoidal part (7) to said second height H of said rectangular part (8) in said radial direction is between 0.30 and 0.60.

13. A rotary electrical machine, comprising a rotor (1), comprising:
a magnetic mass (2);
a plurality of alternating North (N) poles and South poles (S) are formed by a plurality of permanent magnets (3) arranged in first recesses (4) extending axially in said magnetic mass (2), said permanent magnets (3) are distributed regularly between a radially outer circumferential part (5) and a central part (6) of said magnetic mass (2) of the rotor (1), such as to define a plurality of circumferential polar sections (10), each of said permanent magnets (3) having a polygonal radial section; and a plurality of second recesses (11) extending axially, and arranged between said permanent magnets (3), in an intermediate part of said rotor, and radially between said central part (6) and said radially outer circumferential part (5), wherein said polygonal radial section comprises a trapezoidal part (7) close to said central part (6) and a rectangular part (8) close to said radially outer circumferential part (5), said rectangular part (8) is adjacent to said trapezoidal part (7), wherein a ratio R of a first height h of said trapezoidal part (7) to a second height H of said rectangular part (8) in a radial direction is between 0.25 and 0.70, and is predetermined such as to maximize the performance of said electrical machine, and wherein each of the first recesses (4) comprises an opening (12) towards a radially outer periphery of said magnetic mass (2).

\* \* \* \* \*